United States Patent [19]

Berlin

[11] 4,211,735
[45] Jul. 8, 1980

[54] HUMIDIFIER NOZZLE MOUNTING

[75] Inventor: Gary L. Berlin, Manheim, Pa.

[73] Assignee: Herrmidifier Company, Inc., Lancaster, Pa.

[21] Appl. No.: 3,888

[22] Filed: Jan. 16, 1979

[51] Int. Cl.² .............................................. B01F 3/04
[52] U.S. Cl. .................................. 261/116; 126/113; 248/75; 261/118; 261/DIG. 15
[58] Field of Search ............. 261/115, 116, DIG. 15; 126/113; 239/103; 248/75, 212, 346

[56] References Cited

U.S. PATENT DOCUMENTS

| 1,102,736 | 7/1914 | Grabau | 248/212 X |
| 2,464,958 | 3/1949 | Allen | 248/346 X |
| 2,847,989 | 8/1958 | Powers et al. | 261/DIG. 15 |
| 3,102,531 | 9/1963 | Gross | 261/DIG. 15 |
| 3,491,746 | 1/1970 | Swimmer et al. | 261/DIG. 15 |
| 3,515,348 | 6/1970 | Coffman, Jr. | 239/103 |
| 3,633,881 | 1/1972 | Yurdin | 261/DIG. 15 |
| 3,791,633 | 2/1974 | Lowe | 261/DIG. 15 |
| 3,855,371 | 12/1974 | Morrow et al. | 261/116 X |
| 3,898,976 | 8/1975 | Coffman, Jr. | 261/DIG. 15 |

Primary Examiner—Richard L. Chiesa
Attorney, Agent, or Firm—Brady, O'Boyle & Gates

[57] ABSTRACT

An atomizing humidifier nozzle and connected solenoid operated valve are secured as a unit to a box through an adjustable connection which allows the nozzle to assume various angular positions in one plane forwardly of the box as where the nozzle is projecting into a warm air furnace plenum. A thermostat on the forward face of the box is exposed directly to the heat of the plenum. A stepped flange on the forward face of the box along one edge thereof cooperates with a mounting strip bridging an opening in a wall of the furnace plenum to form a convenient hinged connection between such wall and the box, allowing the box to be swung to an inspection and maintenance position. The box can be indexed in ninety degree increments on the plenum wall by relocation of the mounting strip to provide universality in the positioning of the humidifier nozzle on various furance and plenum configurations.

7 Claims, 13 Drawing Figures

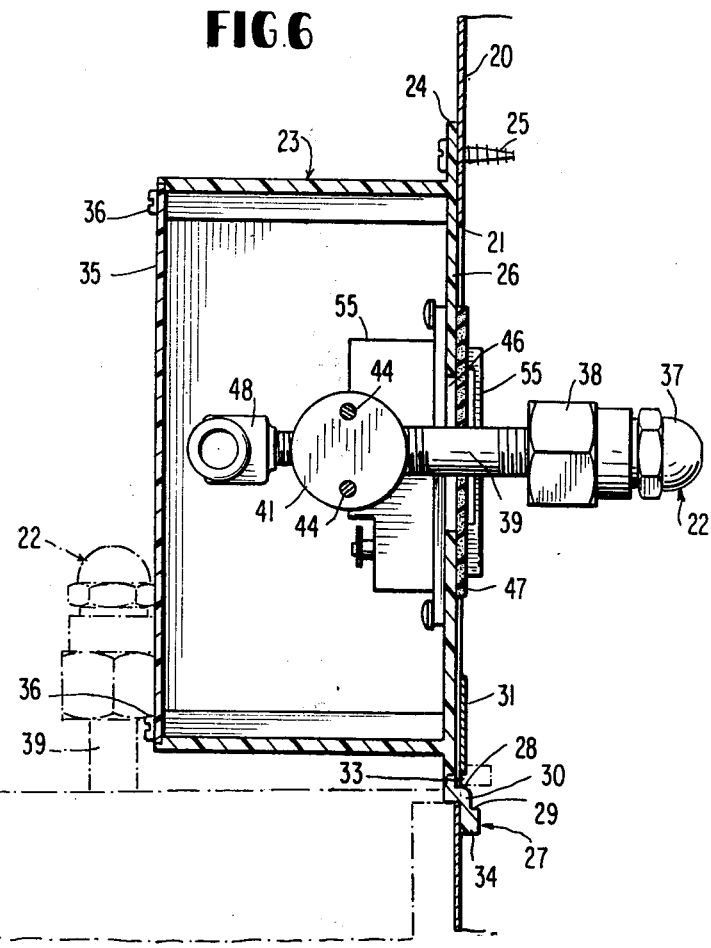
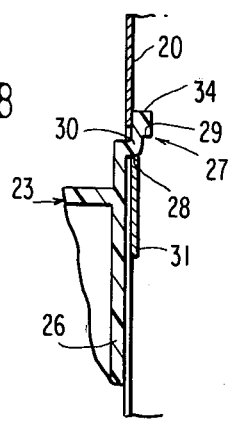
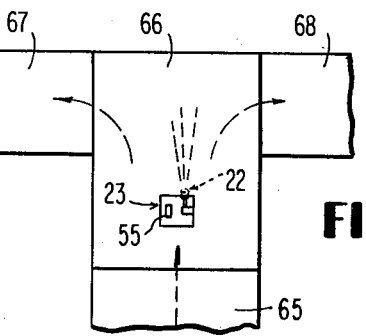
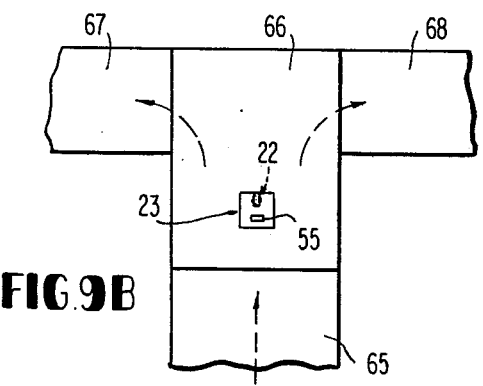
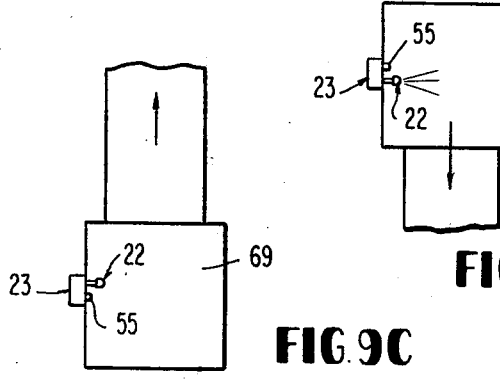
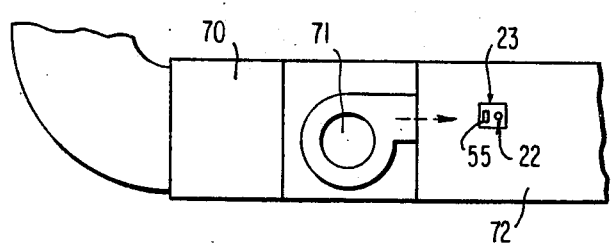

HUMIDIFIER NOZZLE MOUNTING

BACKGROUND OF THE INVENTION

Humidifier nozzle arrangements for hot air furnace plenums and control systems for such nozzles are known in the commercial and patented prior art. Generally speaking, the known humidifier nozzle mountings are not readily adaptable to all of the various duct and plenum configurations which are encountered in present day warm air heating systems. As a result, some of the available humidifier nozzle units must be structurally altered and in some cases cannot be readily adapted to some plenum and duct arrangements. In other cases, the atomizing nozzle proper is mounted on a bendable copper tube to allow for the necessary adjustment of the nozzle. This arrangement is somewhat fragile as well as makeshift or crude. No known atomizing humidifier nozzle assembly is readily adaptable to all, or nearly all, plenum and duct arrangements encountered in the field, and it is the object of this invention to provide a humidifier nozzle mounting which is universal in the sense of ready adaptability to virtually any type of furnace plenum configuration. The invention features a mounting box or housing for the humidifier nozzle and connected solenoid valve unit which may be indexed in ninety degree steps on the wall of a furnace plenum to accommodate different plenum and duct shapes and different furnace air flow patterns. At any indexed position, a flange carried by the box forms a convenient hinge joint with a mounting strip extending across an opening in the adjacent plenum wall. This hinged arrangement facilitates servicing the invention without the necessity of completely separating it from the plenum wall.

To further achieve universality in the mounting of this type of humidifier nozzle on furnace plenums, the nozzle and connected valve assembly are adjustably secured to a wall of the box in such a way that the angularity of the nozzle in one plane can be varied through a considerable arc for reasons to be described in the following detailed description.

The entire invention features simplicity and economy as well as convenience and ruggedness. Conventional control components are utilized. Efficiency of operation is enhanced by the versatility of the invention in terms of being able to position the humidifier nozzle at the optimum operating location and angle in all cases.

The following U.S. patents of general interest are noted herein under 37 C.F.R. 1.56:
U.S. Pat. Nos. 1,102,736, 2,464,958, 3,515,348.

BRIEF DESCRIPTION OF THE DRAWINGS

FIG. 6 is an enlarged vertical section taken on line 6—6 of FIG. 1.

FIG. 7 is a fragmentary vertical section through a hinge connection between the box or housing and a furnace plenum wall.

FIG. 8 is a fragmentary vertical section showing the hinge connection in a 180 degree reversed position of the box in relation to FIG. 6.

FIGS. 9A through 9E are partly schematic elevational views depicting various positioning of the invention on furnace plenums of differing configuration and air flow paths.

DETAILED DESCRIPTION

Figure 1:
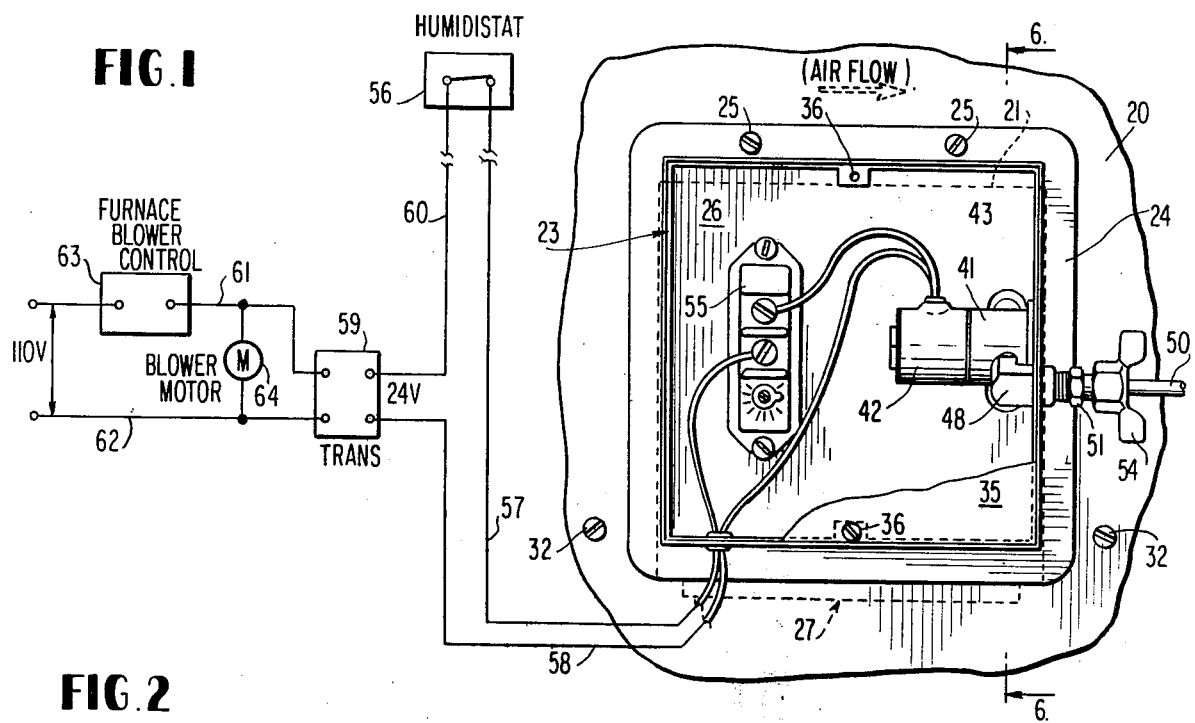
FIG. 1 is a partly schematic rear elevation of the invention in relation to a warm air furnace plenum on which the invention is mounted, partly broken away.
Figures 2, 3:
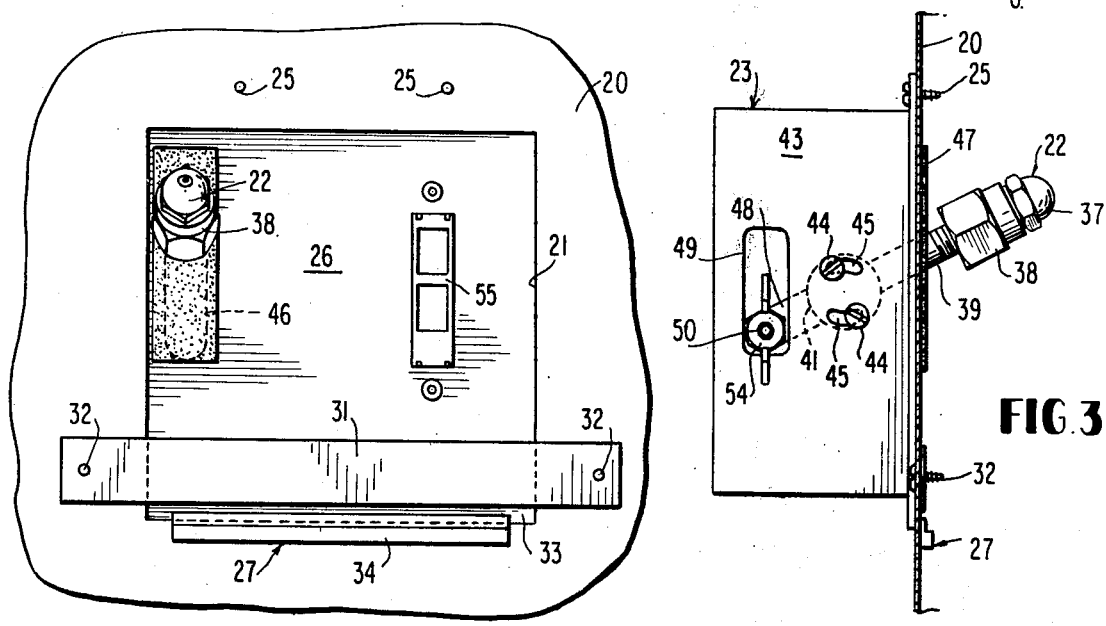
FIG. 2 is a front elevational view of the invention as it would be viewed from inside the plenum chamber.
FIG. 3 is a side elevational view, partly in cross section.

Referring to the drawings in detail wherein like numerals designate like parts, in FIGS. 1 through 6, the numeral 20 designates one wall of a warm air furnace plenum, said plenum wall having a rectangular opening 21 to receive therethrough an angularly adjustable humidifier nozzle 22, to be further described. A rectangular preferably plastic mounting box or housing 23 for the invention has a frontal marginal flange 24 secured along one edge of the box to the plenum wall 20 by a pair of screws 25. The flange 24 and box front wall 26 lie in a common plane and about the outer face of the plenum wall 20 and, in effect, cover the opening 21.

The section of the flange 24, 180 degrees opposite to the mounting screws 25, carries an integral two stepped bar or extension 27 extending along one side of the box and having first and second parallel step surfaces 28 and 29 at right angles to the plane of the wall 20 and an intervening step connecting web 30 parallel to the plane of the wall 20 when the box 23 is disposed as shown in full lines in FIG. 6.

As depicted in that figure, the bar 27 can be engaged in interlocked relation with any edge of the rectangular opening 21 depending upon the placement of the screws 25 and the indexing of the box 23 in any of four possible positions ninety degrees apart in rotation around the opening 21. In any such selected position, a single retainer strip or plate element 31 is secured to the inner face of the plenum wall 20 by a pair of screws 32 and spans the opening 21 completely forming a comparatively narrow slot 33, FIG. 2, between one edge of the strip 31 and the adjacent parallel edge of the opening 21. The stepped bar 27 can be engaged through the slot 33 which is slightly wider than the enlarged head portion 34 of the bar 27 and the bar can be lodged behind the wall 20, as shown in FIG. 6 in full lines, with its stepped portion or web resting on the adjacent edge of the opening 21. The described arrangement also forms a convenient hinge joint between the box 23 and plenum wall 20 in any mounting position of the box, to enable the box, the nozzle 22 and all associated parts to be swung ninety degrees away from the wall 20 to a convenient service position, as shown in broken lines in FIG. 6. In this position, the nozzle 22 and other components are readily accessible for cleaning or other maintenance. The box 23 also has a removable rear closure panel 35 secured by screws 36.

Figure 4:
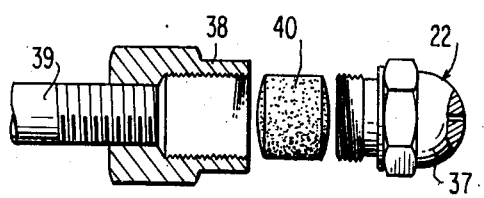
FIG. 4 is an exploded side elevation, partly in section, of a nozzle assembly.
Figure 5:
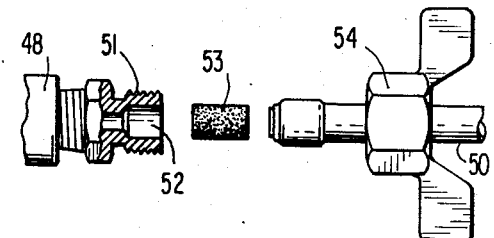
FIG. 5 is a similar view of a water feed line connection and filter upstream from the solenoid actuated valve.

The nozzle 22, FIG. 4, which is conventional consists of an atomizing nozzle tip 37 coupled through a threaded nipple 38 to a tubular stem 39, a filter element 40 being located in the flow path. The nozzle stem 39 is threaded into one side of a cylindrical solenoid operated valve 41 having an attached solenoid 42. The valve and solenoid axis is perpendicular to the axis of the nozzle 22. The solenoid actuated valve is also conventional and may be of the type manufactured by ASCO (Automatic Switch Co.), Florhan Park, N.J., Catalog No. US 82617.

The valve 41 and solenoid are supported as a unit within the box 23 somewhat rearwardly of the box front wall 26 on one box side wall 43. More particularly, the end face of the valve 41 away from solenoid 42 is adjustably secured to the side wall 43 by a pair of spaced screws 44, FIG. 3, having threaded engagement with the valve 41 and extending through a pair of arcuate adjusting slots 45 forming arcs of a circle centered on the axis of the solenoid operated valve 41. Through this mounting arrangement, the valve may be rotated on its longitudinal axis within limits defined by the adjusting slots 45. During such adjustment, the atomizing nozzle 37 has its axis correspondingly adjusted in one direction or the other, within the chamber of the plenum in which the nozzle operates.

A clearance slot 46 for the adjustable nozzle stem 39 is formed through the box front wall 26 near and parallel to the side wall 43. To prevent the entry of pressurized hot air in the furnace plenum from entering the box 23 a plate valve 47 formed of rubber or the like is mounted bodily and snugly on the stem 39 and slides against the forward face of the box wall 26 to cover the slot 46 in all adjusted positions of the nozzle. Air pressure in the plenum tends to seat the valve element 47. The valve element 47 moves back and forth with the stem 39 as the angle of the nozzle 22 is adjusted by the arcuate slot means shown in FIG. 3. The screws 44 enable the valve 41 and nozzle 22 to be releasably locked in any selected adjusted position.

Also forming part of a unit assembly with the valve 41 and nozzle 22 is a water inlet elbow 48 threaded into the side of the valve body diametrically opposite the stem 39 and thus lying within the box 23. The elbow 48 extends through a clearance slot 49 in the box side wall 43 which allows the elbow to swing about the axis of the valve 41 when the valve and nozzle are adjusted in the described manner. A water inlet tube 50 coupled with a remote water pipe, not shown, delivers humidifying water to the elbow 48 through a fitting 51, FIG. 5, having a cavity 52 for a second filter element 53 upstream from the nozzle filter 40. Another manually operated fitting or nut 54 serves to couple the water delivery tube 50 with the fitting 51 of the elbow after the filter element 53 is in place.

The system further comprises a conventional thermostat 55 mounted on the front wall 26 with the sensitive part of this thermostat projecting through a slot in the wall 26 and into the chamber of the plenum. The thermostat 55 is a standard commercial component manufactured by Therm-O-Disc, Model 40T. An equivalent conventional thermostat can be used.

In FIG. 1, the remainder of the humidifier control system is illustrated, and includes a humidistat 56 located at a remote point in the home or building and coupled in series with the thermostat 55 and the coil of solenoid 42 via wires 57 and 58. A transformer 59 is electrically coupled between the humidistat and the solenoid coil via wires 58 and 60 and the high voltage side of the transformer is coupled through wires 61 and 62 with a 110 volt power source. In some cases, the system may be operated on standard 110 volts without the need for a transformer. A conventional furnace burner and blower control means 63 is coupled in the power line 61 and the blower motor 64 is electrically coupled across the lines 61 and 62.

It is important that the humidifier nozzle 22 not be activated until the hot air blower is in operation. This is to prevent the atomized water discharge from wetting the opposing walls of the plenum chamber or closely adjacent ducts. It is also necessary to avoid discharging the spray from the nozzle 22 on the thermostat 55 which would adversely effect its sensitivity and operation. Therefore, the nozzle 22 must always be located downstream from the thermostat 55 in relation to the warm air stream in the plenum chamber. The invention is constructed to meet all of these requirements. In a humidifier of this type, the objective is to spray the atomized water into the plenum only when the hot air is moving so that the water will immediately evaporate in the air stream and be entrained therein so as not to reach and wet the far wall or any walls of the plenum chamber.

Concerning the control system shown in FIG. 1 which is largely conventional, even if the house humidistat 56 calls for increased moisture, the solenoid activated valve 41 will not open to admit water to the nozzle 22 unless and until the thermostat 55 exposed to heat in the plenum closes and completes the electrical circuit, thus assuring that the plenum temperature is sufficient to quickly evaporate the atomized spray and also assuring that the furnace blower is in operation.

FIGS. 9A through 9E illustrate the versatility of mounting of the box 23 on the plenum chamber wall and of adjusting the angle of the nozzle 22 to assure that the humidifier will be operating with optimum efficiency in any type of hot air system or any shape or size of plenum, and also assuring that the nozzle 22 is always downstream from the thermostat 55 in relation to air flow in the system shown by the directional arrows in FIGS. 9A through 9E. FIG. 9A shows a side schematic view of an updraft furnace 65 with plenum chamber 66 feeding upper branch air ducts 67 and 68. The box 23 is mounted with the nozzle 22 facing downstream and laterally of the thermostat 55 as there is no problem in this instance relative to directing the moisture spray onto the thermostat 55. The angle of the nozzle 22 is adjusted through the means 44–45 to direct the nozzle spray upwardly toward the top of the plenum 66 and in an arc toward the far wall of the plenum 66. Full evaporation of the spray will occur in the plenum.

In FIG. 9B, the box 23 is indexed 90 degrees from the box shown in FIG. 9A, and the nozzle 22 is positioned downstream of the thermostat 55 and is directed horizontally toward the far wall of the plenum 66 which is deeper in the horizontal plane than the plenum shown in FIG. 9A.

In FIG. 9C, with air flow from the plenum 69 being in the direction of the arrow, the nozzle 22 is properly downstream from the thermostat 55 and is facing the far side wall of the plenum in a situation where the plenum is widest in that direction and shallow in the right angular direction. Angular adjustments of the nozzle 22 can always be made as required for precision. The basic orientation of the nozzle 22 relative to the air stream and the thermostat 55 is attained by indexing the box 23 ninety degrees or a full 180 degrees in the described manner as the situation demands in a particular installation. Such indexing or adjustment of the box merely requires relocating the strip 31 along a different edge of the opening 21. There will of course be only one chosen position for the box per installation.

FIG. 9D shows another mounting of the box 23 indexed 180 degrees from the position in FIG. 9C so that the nozzle 22 is again downstream from the plenum thermostat 55 in the air flow situation depicted.

FIG. 9E depicts a horizontal furnace 70 having a blower 71 and plenum 72 with the box 23 mounted to place the nozzle 22 downstream from the thermostat 55 and across the plenum 72 which may be very wide in the direction axially of the nozzle and comparatively shallow across the nozzle axis.

It should now be apparent that the invention makes possible a universal mounting and adjustment of the humidifier to satisfy the requirements of a variety of furnace and plenum configurations and to assure optimum efficiency of operation in all cases.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A humidifier for universal mounting on a furnace plenum to accommodate different plenum and duct shapes wherein the plenum has an opening in one wall thereof comprising a support adapted to be mounted on said wall adjacent to and overlying said opening in a selected one of four indexed positions relative to the opening, a separate mounting strip adapted to be mounted on said wall across said opening and near and along one selected edge of the opening defining a longitudinal slot between an edge of said mounting strip and the adjacent one edge of said opening corresponding to the selected indexed position, cooperative means along one side of said support engagable through the slot forming a hinged connection between said wall and said support and enabling the support to be swung away from said wall in one direction while remaining attached thereto, a mounting portion connected substantially normal to and extending away from said support, a solenoid actuated valve, a humidifier nozzle rigidly connected to and extending from said solenoid actuated valve through said support and said opening and into said furnace plenum, a water supply means coupled with said valve and extending exteriorly of said support, selectively adjustable and lockable rotational connection means between said mounting portion and said solenoid actuated valve through which the angle of said humidifier nozzle is adjusted in a plane normal to said support by rotation of said solenoid actuated valve and locked in selected angular positions relative to said support for optimum efficiency of the humidifier nozzle inside the plenum in the selected indexed position.

2. A humidifier as defined in claim 1, and said cooperative means comprising a stepped extension along said one side of said support, and said stepped extension engageable through said slot.

3. A humidifier as defined in claim 1, and said support comprising a box-like support having a side wall comprising said mounting portion, and said selectively adjustable and lockable rotational connection comprising arcuate slots in said side wall and adjustable fasteners engaging within said slots and secured to said solenoid actuated valve within the interior of the box-like support.

4. A humidifier as defined in claim 3, and the box-like support having a frontal slot through which a part of said humidifer nozzle extends swingably, and a valve element secured to and moving with said humidifier nozzle and serving to cover said frontal slot in all adjusted positions of the nozzle to prevent the passage of air from said plenum into the box-like support.

5. A humidifier as defined in claim 1, and a thermostat secured to said support in spaced relation to one side of said nozzle of the humidifier means.

6. A humidifier as defined in claim 1, in which said support and said mounting portion comprise two substantially right angular walls, and said walls having clearance slots for said nozzle and water supply means to allow the necessary adjustments thereof through said selectively adjustable and lockable rotational connection means.

7. A humidifier as defined in claim 1, and said solenoid actuated valve having an axis across the axis of said nozzle and said water supply means, and said solenoid actuated valve and water supply means disposed wholly outside of said plenum and at least partly within the confines of said support.

* * * * *